United States Patent [19]

Gude et al.

[11] 4,014,954
[45] Mar. 29, 1977

[54] METHOD FOR PREPARING MOLDINGS AND COATINGS

[75] Inventors: Fritz Gude; Siegfried Brandt; Elmar Wolf, all of Herne; Johann Obendorf, Dorsten, all of Germany

[73] Assignee: Veba-Chemie AG, Gelsenkirchen-Buer, Germany

[22] Filed: May 30, 1975

[21] Appl. No.: 582,534

[30] Foreign Application Priority Data

June 21, 1974 Germany .......................... 2429765

[52] U.S. Cl. .......................... 260/830 P; 260/2 N; 260/2 EA; 260/47 EN; 260/47 EA
[51] Int. Cl.$^2$ .......................... C08L 63/02
[58] Field of Search .......... 260/830 P, 2 EC, 2 EP, 260/2 N, 47 EN, 47 EA, 2 EA

[56] References Cited

UNITED STATES PATENTS

| | | | |
|---|---|---|---|
| 3,091,595 | 5/1963 | Mika | 260/830 P |
| 3,386,955 | 6/1968 | Nawakowski | 260/2 N |
| 3,386,956 | 6/1968 | Nawakowski | 260/2 N |

*Primary Examiner*—Paul R. Michl
*Attorney, Agent, or Firm*—Burgess, Dinklage & Sprung

[57] ABSTRACT

Molding method and polyadducts for molding objects and coatings from 1,2-epoxy compounds having more than one epoxy group in the molecule and ureas having the formula:

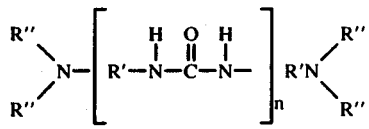

wherein
$n \geq 1$,
R' is an alkylene or arylene radical,
R'' is hydrogen and at least one radical from the group of

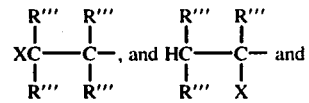

the group

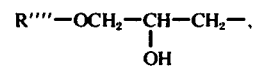

R''' being the same or different radical from the group of hydrogen and alkyl, X being an R''λ'OOC—, R'''$_2$NOC— or NC— radical and R'''' being alkyl or aryl.

6 Claims, No Drawings

METHOD FOR PREPARING MOLDINGS AND COATINGS

BACKGROUND

The invention relates to a method for the preparation of molding compositions and to the molding compositions themselves, which are composed of epoxy resins with substituted ureas or polyureas as hardeners.

The subject matter of German "Offenlegungsschrift" 1,770,814 is thermoplastically workable, thermosetting combinations of epoxy resin and hardener having a long shelf life, which can be prepared by mixing polyureas containing two and preferably three and more urea groups in the molecule, with epoxy resins. The polyureas have the structural framework —[NH-CO-NH-R]—$_{n+1}$, n in the formula being equal to or greater than 1 and R being the bivalent radical of a diamine or of a polyamide of low molecular weight. R can also have a valence greater than 2 provided that the amount added does not permit any cross-linking. These resin-hardener combinations have the advantage that they do not react at normal temperature and are thus stable in storage. They have thermoplastic properties over a wide temperature range and can be worked in the manner of thermoplastics, for example in extruders and injection molding machines. Not until the temperature rises, usually above 150° C, do the thermosetting characteristics prevail.

THE INVENTION

It has now been found that it is possible by mixing epoxy resins with urea components of molecular weights all the way down to the monomer to prepare thermosets of long shelf life which harden completely at high temperatures, the amine groups of the urea component having to be at least partially substituted.

The subject matter of the invention is therefore a method for the preparation of shaped products and coatings on the basis of ureas and polyadducts of 1,2-epoxy compounds having more than one epoxy group in the molecule, at elevated temperature, in accordance with known methods, characterized in that the ureas are those of the general formula:

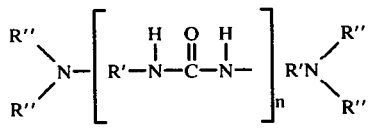

in which $n \geq 1$, R' represents an alkylene or arylene radical, R" represents hydrogen and at least one radical of the group:

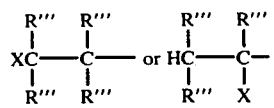

or a radical of the group

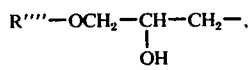

being an identical or different radical of the group hydrogen or alkyl radicals, X represents an R'''OOC, R'''$_2$NOC or NC radical, and R'''' represents an alkyl or aryl radical.

Additional subject matter of the invention is molding compositions for the production of shaped products and coatings, consisting of 1,2-epoxy compounds having more than one epoxy group in the molecule and a urea of the general formula

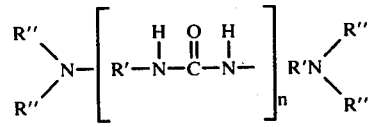

in which $n \geq 1$, R' represents an alkylene or arylene radical, R" represents hydrogen and at least one radical of the group

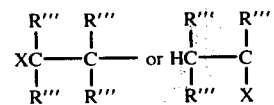

or a radical of the group

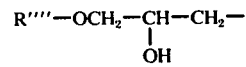

R''' representing an identical or different radical of the group hydrogen or alkyl radicals, X an R''' OOC, R'''$_2$-NOC or NC radical, and R'''' an alkyl or aryl radical.

DESCRIPTION

The term "alkyl radicals," as used herein, is to be understood to mean lower alkyls, e.g., being 1 to 6 carbon atoms such as butyl and the term "aryl radicals" have 6–10 carbon atoms especially phenyl.

The formation of the polyadducts themselves takes place especially in the temperature range of 130°–250° C.

The use of these terminally substituted polyureas has further advantages in addition to improved shelf life. For example, in all of the compositions of the invention, the epoxy resin requirement is reduced. As a result, the excess needed for stability in storage is smaller. This greatly increases the setting speed, so that, for example, the time for which molding compositions must be let stand in the mold can be reduced to one half of the time that is required without substitution of the amino groups.

The substituted oligo- and polyureas can be prepared as follows: by the condensation of diamines with carboxylic acid derivatives by known methods, e.g., with urea, followed by nitrogen substitution, e.g., with acrylic derivatives. However, diamines containing both a secondary and a primary amino group can also be condensed with urea. Preference is given to the first method, however, especially when acrylic derivatives are used, because it leads to products having a uniform composition, which have better mechanical strength after setting.

The hydrogen atom content in R''' is to be between 0 and 90 mole-%, preferably between 20 and 80 mole-%.

The degree of polymerization of the ureas is unimportant in the method of the invention, because in this case the same fragments are formed and enter the reaction. It is basically advantageous, however, to use oligomers in which $n \geq 1$ to 10 in order to minimize the kneading work involved in mixing with epoxy resin, which is transformed into heat. Oligomers in which $n \geq 2$ to 5 are to be stressed, since they result in an especially rapid and uniform cross-linking.

Fundamentally, any diamine can be used for the preparation of the urea derivative. It has been found, however, that the aliphatic open-chained and cyclic diamines offer technical advantages as regards processing. In addition to the greater speed of reaction, the lower viscosity and the significantly more rapid homogenization which is attained in mixing the ureas with epoxy resins are important advantages. This effect is to be observed especially in the use of C-alkyl-substituted diamines, and this is why the use of branched aliphatic and cycloaliphatic diamines is a preferred embodiment of this invention.

The following diamines are named by way of example: m- and p-phenylenediamine, 2,4-diaminotoluene, 4,4'-diaminodiphenylmethane, hexamethylenediamine, dodecamethylenediamine, a diamine-triamine mixture prepared from dimerized fatty acid via the dinitrile and containing 95% diamine, 2-methylhexamethylenediamine, 2,2,4- and 2,4,4-trimethylhexamethylenediamine, 1,3- and 1,4-diaminocyclohexane, 2,2bis-(4-aminocyclohexyl)-propane, 1-amino-3-aminomethyl-3,5,5-trimethylcyclohexane, N-aminoethylpiperazine.

The concomitant use of amines of higher functionality is also possible.

The substituents on the amino groups can be introduced, for example, by reaction with the following acrylic derivatives or glycidyl ethers: acrylonitrile, methacrylonitrile, crotonic acid nitrile, acrylic acid methyl, ethyl, isopropyl, n-butyl, tert.-butyl, isooctyl, lauryl and stearyl ester, methacrylic acid methyl ester, crotonic acid ethyl ester, acrylamide, methacrylic acid-N-methylamide, phenylglycidyl ether, n-butylglycidyl ester, allylglycidyl ether.

The molding compositions of the invention are prepared by mixing the ureas with epoxy compounds containing more than one 1,2-epoxy group per molecule. Suitable epoxides are those of polyunsaturated hydrocarbons (vinylcyclohexene, dicyclopentadiene, cyclohexadiene, cyclododecadiene, cyclododecatriene, isoprene, 1,5-hexadiene, butadiene, polybutadienes, divinylbenzenes and the like), epoxy ethers of polyvalent alcohols (ethylene glycols, propylene glycols, butylene glycols, polyglycols, thiodiglycols, glycerin, pentaerythritol, sorbitol, polyvinyl alcohol, polyallyl alcohol, and the like), epoxy ethers as well as polyhomologous epoxy ethers of polyvalent phenols (resorcinol, hydroquinone, bis-(4-hydroxyphenyl)-methane, bis-(4-hydroxy-3-methylphenyl)-methane, bis-(4-hydroxy-3,5-dichlorophenyl)-methane, bis-(4-hydroxy-3,5-dichlorobromophenyl)-methane, bis-(4-hydroxy-3,5-dichlorophenyl)-methane, 1,1-bis-(4-hydroxyphenyl)-ethane, 2,2-bis-(4-hydroxyphenyl)-propane, 2,2-bis-(4-hydroxy-3-methylphenyl)-propane, 2,2-bis-(4-hydroxy-3-chlorophenyl)-propane, 2,2-bis-(4-hydroxy-3,5-dichlorophenyl)-propane, bis-(4-hydroxyphenyl)-phenylmethane, bis-(4-hydroxyphenyl)-diphenylmethane, bis-(4-hydroxyphenyl)-4'-methylphenylmethane, 1,1-bis-(4-hydroxyphenyl)-2,2,2-trichloroethane, bis-(4-hydroxyphenyl)-(4-chlorophenyl)-methane, 1,1-bis-(4-hydroxyphenyl)-cyclohexane, bis-(4-hydroxyphenyl)-cyclohexylmethane, 4,4'-dihydroxydiphenyl, 2,2'-dihydroxydiphenyl, 4,4'-dihydroxydiphenylsulfone as well as hydroxyethyl ethers thereof, of phenol-formaldehyde condensation products such as phenolic alcohols, phenolic aldehyde resins, and the like, sulfur-containing and nitrogen-containing epoxides (N,N'-diglycidylaniline, N,N'-dimethyldiglycidyl-4,4'-diaminodiphenylmethane), as well as epoxides which have been prepared by conventional methods from polyunsaturated carboxylic acids or mono-unsaturated carboxylic acid esters of unsaturated alcohols, glycidyl esters, polyglycidyl esters which can be obtained by the polymerization of copolymerization of glycidyl esters of unsaturated acids, or are obtainable from other acid compounds (cyanuric acid, diglycidyl sulfide, cyclic trimethylenetrisulfone, or derivatives thereof, etc.). Not only the above pure epoxides but also mixtures thereof, as well as mixtures thereof with monoepoxides, in the presence, if desired, of solvents or plasticizers, can be reacted by the method specified herein. For example, the following monoepoxides can be used in mixtures with the above-named epoxide compounds: epoxidized mono-unsaturated hydrocarbons (butylene oxide, cyclohexene oxide, styrene oxide, etc.), epoxides containing halogen, such as, for example, epichlorhydrin, epoxy ethers of univalent alcohols (methyl, ethyl, butyl, 2-ethylhexyl and dodecyl alcohol, etc.), epoxy ethers of univalent phenols (phenol, cresol and other phenols substituted in the ortho or para position), glycidyl esters of unsaturated carboxylic acids, epoxidized esters of unsaturated alcohols or unsaturated carboxylic acids, as well as the acetals of glycide aldehyde.

The preparation of the mixtures is performed by known methods, e.g., by kneading on a friction roller, in kneaders and in extruders. In many cases, mixing in solution is also desirable.

By the admixture of known catalysts, such as acids, acid salts, bases, or metal oxides, and by the admixture of organometallic compounds, the reactivity can be controlled. For example, by the addition of only 0.1% of tertiary bases it is possible to accelerate hardening. The catalysts involved include sulfuric acid, ammonium hydrogen phosphate, silicon oxides, aluminum oxides, potash lye, alcoholates, pyridine, quinoline, dimethylaniline and triethylenediamine.

The molding compositions of the invention are fabricated by known methods.

The use of the substances of the invention offers great advantages in fabricating processes which require not only stability at elevated storage temperatures but also a stable viscosity during the thermoplastic phase of the process, as is the case, for example, in the injection molding process.

The incorporation of fillers, pigments, etc., can be performed either during the preparation of the mixtures or during plastification in the injection molding machine, or during any other procedures which are performed in the thermoplastic state.

EXAMPLES

The following examples will serve to explain the subject matter of the invention without placing a limitation thereon.

EXAMPLE 1

A solution of 16.0 weight-parts of p-phenylenediisocyanate in 20 wt.-parts of chlorobenzene was added to a solution of 21.6 wt.-parts of m-phenylenediamine in 100 wt.-parts of hot benzene. After the solvent had been distilled out, the polyurea had an $NH_2$ content of 4.6 molar equivalents per gram (me/g).

18.2 wt.-parts of this polyurea were dissolved in 50 wt.-parts of dimethylformamide. After the addition of 3.6 wt.-parts of acrylonitrile, the solution was heated at 80° C. Then 80.3 wt.-parts of an epoxy resin on a bisphenol-A basis, having an epoxy value of 0.22, dissolved in 150 wt.-parts of dimethylformamide, was added, with stirring, and the solution was heated for one hour at 100° C.

After the mixture had cooled, a viscosity of 350 cP was measured at 25° C. After 6 months of storage, the viscosity had increased to 410 cP.

The solution was applied to sheet steel, and the coating that remained after air drying was heated for 30 minutes at 180° C. The film was hard and flexible and resistant to acetone. The Österle melting temperature was 215° C.

Österle's method of measurement with a penetrometer using a heated needle is described in "Schweiz. Archiv für Angewandte Wissenschaft und Technik" 22 (1956), pp. 429–435.

EXAMPLE 2

A polyurea prepared as in Example 1 from 24.6 wt.-parts of 2,4-diaminotoluene and 17.5 wt.-parts of diisocyanatotoluene had an $NH_2$ content of 4.1 molar equivalents per gram.

13.6 wt.-parts of this polyurea were dissolved in 50 wt.-parts of dimethylformamide. The solution, after the addition of 1.75 wt.-parts of acrylonitrile, was heated for 2 hours at 80° C. Then 82.2 wt.-parts of an epoxy resin on a bisphenol-A basis, having an epoxy value of 0.22, dissolved in 150 wt.-parts of dimethylformamide was added with vigorous stirring. The mixture was heated for 10 minutes at 100° C.

After the mixture had cooled, a viscosity of 400 cP was measured at 25° C. After 6 months of storage the viscosity increased to 500 cP.

The solution was applied to a piece of sheet steel, air-dried, and heated for 30 minutes at 180° C. The film thus produced was hard and flexible and had good resistance to acetone, methanol and toluene.

The Österle melting temperature was 205° C.

EXAMPLE 3

A polyurea prepared from urea and a mixture of nonamethylenediamine and dodecamethylenediamine in a 1:1 molar ratio by fusion condensation at 150° to 210° C over a period of 5 hours had an $NH_2$ content of 3.4 me/g.

14.7 wt.-parts of methacrylic acid methyl ester were added to 39.5 wt.-parts of this polyurea. Then the reaction mixture was heated for another hour, at about 120° C. It was then cooled to 70° C and, over a period of 10 minutes, 45.8 wt.-parts of a liquid epoxy resin on a bisphenol-A basis, having an epoxy value of 0.5, plus 0.1 wt.-parts of dimethylbenzylamine were added, and incorporated by vigorous stirring. The reaction mixture was heated for another hour at 70° C and freed of volatile components by vacuuming.

The setting time of this polyurea-epoxide mixture was 250 seconds at 160° C. After 6 months of storage the setting time at 160° C was 230 seconds. An object made by injection molding can be stripped from the mold at 180° C after 60 seconds.

EXAMPLE 4

33.6 wt.-parts of a polyurea prepared from 3-methylhexamethylenediamine and urea as in Example 3 and having an $NH_2$ content of 4.7 me/g, were reacted by the process described in Example 3 with 14.4 wt.-parts of acrylic acid methyl ester and 52.0 wt.-parts of the epoxy used in Example 3, plus 0.1 wt.-parts of 1,4-diazabicyclo-(2,2,2)-octane.

The polyurea-epoxide mixture thus obtained had a setting time of 270 seconds at 160° C. After 6 months of storage the setting time was 240 seconds. The polyurea-epoxy mixture, used as a molding composition, hardens in 150 seconds at 180° C. The molded objects were colorless and were characterized by a high impact toughness.

EXAMPLE 5

A 1:1 isomer mixture of 2,4,4- and 2,2,4-trimethylhexamethylenediamine and urea were condensed in the melt, as in Example 3, to form a polyurea having an $NH_2$ content of 5.8 me/g.

To 9.95 wt.-parts of the molten urea, 7.42 wt.-parts of acrylic acid n-butyl ester were added over a period of 10 minutes. Then the reaction mixture was heated for another hour at 100° C.

Then, at 100° C, 82.5 wt.-parts of a molten epoxy resin having an epoxy value of 0.1 were added with vigorous stirring. The mixture was kept for 10 more minutes at 140° C and then rapidly chilled.

The glass softening temperature of this mixture of urea and epoxide was at 56° C. After 6 months of storage the glass softening temperature was 58° C.

This mixture was applied to steel sheets by the electrostatic powder spraying process and baked on at 180° C for 10 minutes. The films had very good mechanical properties and were resistant to acetone and to methanol.

EXAMPLE 6

A polyurea having an $NH_2$ content of 2.8 me/g was prepared by the fusion polymerization, described in Example 3, of a 1:1 isomer mixture of 2,4,4- and 2,2,4-trimethylhexamethylenediamine and urea.

10.6 wt.-parts of this polyurea were reacted with 3.84 wt.-parts of acrylic acid n-butyl ester.

14.5 weight-parts of the reaction product, 0.1 wt.-parts of triethylene diamine, and 85.5 wt.-parts of the epoxy resin used in Example 5, were thoroughly mixed together on a roller mixer at about 70° C, for 10 minutes. The glass softening temperature of this mixture was 65° C. After 24 hours of storage at 50° C, the glass softening temperature was 66° C.

A sheet made with this polyurea-epoxy resin powder by pressing for 2 minutes at 180° C was very hard, transparent and resistant to both acetone and methanol.

EXAMPLE 7

23.5 wt.-parts of a polyurea with an $NH_2$ content of 0.99 me/g, prepared by fusion condensation, as in Example 3, from a 1:1 isomer mixture of 2,4,4- and 2,2,4-trimethylhexamethylenediamine and urea, were reacted as described in Examples 5 and 6 with 9.58 wt.-parts of acrylic acid lauryl ester in the melt.

33.1 wt.-parts of this reaction product, 0.1 wt.-parts of potassium tert.-butylate and 67.0 wt.-parts of an epoxy resin on a bisphenol-A basis having an epoxy value of 0.1 were intimately mixed together in a double screw extruding machine. The kneading resistance of this mixture, as measured with a Brabender Plastograph, amounted to 2.00 kpm at 80° C. After 24 hours of standing at 50° C a value of 2.05 kpm was measured.

The objects made from this material by injection molding were very impact resistant and stable in shape after a setting time of 3 minutes at 180° C.

EXAMPLE 8

10.3 wt.-parts of a polyurea with an $NH_2$ content of 5.4 me/g, prepared by fusion condensation from 1-amino-3-aminomethyl-3,5,5-trimethylcyclohexane and urea under the conditions specified in Example 3, were reacted with 10.3 wt.-parts of acrylic acid 2-ethylhexyl ester in the melt, in a manner similar to that described in Examples 6 and 7.

20.5 wt.-parts of this product, 0.1 wt.-parts of triethylenediamine and 79.5 wt.-parts of the epoxide used in Example 7 were mixed for 10 minutes in a kneader at 80° C.

The setting time of this mixture amounted to 200 seconds at 160° C. After 24 h of standing at 50° C it decreased to 190 seconds.

The moldings made from this polyurea-epoxide mixture, which were hardened for 10 minutes at 180° C, were very hard and transparent and they had a smooth surface. They were resistant to organic solvents.

EXAMPLE 9

A polyurea prepared by fusion condensation from urea and 1-amino-3-aminomethyl-3,5,5-trimethylcyclohexane plus 2,2,4- and 2,4,4-trimethylhexamethylenediamine (1:1) in a molar ratio of 0.7 : 0.3, had an $NH_2$ content of 3.6 me/g.

10.1 wt.-parts of acrylic acid 2-ethylhexyl ester were added in the melt to 13.3 wt.-parts of this polyurea. The reaction mixture was then maintained at 160° C for 2 hours. It was then mixed in an extruder with 0.1 wt.-parts of triethylenediamine and 76.8 wt.-parts of an epoxide on a bisphenol-A basis having an epoxy value of o.1.

At 120° C the viscosity of this mixture was 56,000 cP. After 6 months of storage it increased to 58,600 cP.

The product was pulverized and was applied to sheet steel by means of an electrostatic powder spraying system, and it was baked on by heating at 160° C for 10 minutes. The films had a good leveling action; they were hard and resilient and resistant to acetone.

EXAMPLE 10

20.7 wt.-parts of a polyurea prepared by the fusion condensation at 150°-200° C of 1-amino-3-aminomethyl-3,5,5-trimethylcyclohexane and urea were pulverized and mixed with 11.3 wt.-parts of phenyl glycidyl ether. The mixture was heated with stirring until it became uniformly melted. 22.0 wt.-parts of this mixture were mixed in a kneader with 68.0 wt.-parts of an epoxy resin on a bisphenol-A basis having an epoxy value of 0.22, and with 0.02 wt.-parts of dimethylaniline.

No increase of viscosity resulted for 24 hours of standing at 50° C or from 30 minutes at 100° C. At 150° C it hardened within a maximum of 10 minutes. Objects made under these conditions were hard and impact resistant and were distinguished by a high thermal stability of shape.

The molding compositions of the invention can also be applied in the form of finely powdered surface coating materials. These are applied to objects by known methods, e.g., by electrostatic dusting, sintering in a fluidized bed, electrostatic fluidized bed sintering, etc. Prior to their application, the components of such surface coating materials are intimately mixed, extruded, and then ground. For practical application, a particle size of less than 100 microns is preferred, with a predominant size range of 30 to 50 microns.

After the powdered coating material has been applied to the objects to be coated, the latter are heated at temperatures of 130° to 210° C, preferably 140° to 180° C, so as to set the material. Thereafter the coating will have the advantages described above.

The additives contained in the powdered coating material, such as pigments, dyes, fillers, etc., can vary widely in proportion to the amount of the binding substance.

What is claimed is

1. Process for manufacturing molded objects and coatings from polyadducts made from 1,2-epoxy compounds having more than one epoxy group in the molecule and ureas, at elevated temperatures which comprises using as the ureas compounds having the general formula

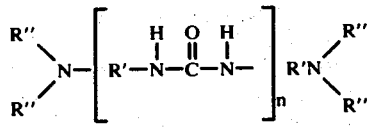

wherein
$n \geq 1$,
R' is an alkylene or arylene radical,
R" is hydrogen and at least one radical from the group of

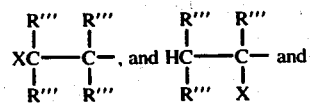

and
the group

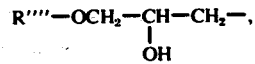

R''' being the same or different radical from the group of hydrogen and alkyl, X being an R'''OOC—, R'''$_2$NOC— or NC— radical and R'''' being alkyl or aryl.

2. Process of claim 1 wherein the polyadduct is performed at temperatures ranging from 130° to 250° C.

3. Process of claim 1 wherein the coatings are applied to a substrate in the form of finely divided, powdered compositions.

4. Molding composition for the manufacture of molded objects and coatings comprising polyadducts of 1,2-epoxy compounds having more than one epoxy group in the molecule and polyureas having the formula

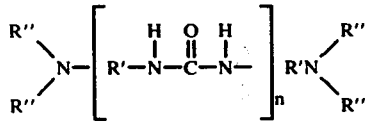

wherein
$n \geq 1$,
R' is an alkylene or arylene radical,
R'' is hydrogen and at least one radical from the group of

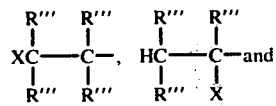

and

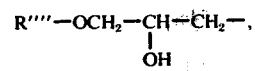

R''' being the same or different radical from the group of hydrogen and alkyl, X being an R'''OOC—, R'''$_2$NOC— or NC— radical and R'''' being alkyl or aryl.

5. Composition of claim 4 wherein from 20 to 80 mole percent of the R''' substituents are hydrogen.

6. Composition of claim 4 wherein $n \geq 1$ to 10, preferably $\geq 2$ to 5.

* * * * *

UNITED STATES PATENT AND TRADEMARK OFFICE
CERTIFICATE OF CORRECTION

PATENT NO. : 4,014,954
DATED : March 29, 1977
INVENTOR(S) : Fritz Gude et al

It is certified that error appears in the above-identified patent and that said Letters Patent are hereby corrected as shown below:

[57], Abstract, third to last line,"R''$\lambda$' " should read

-- R''' --.

Column 2, line 1, before "being" insert -- R''' --.

Signed and Sealed this sixteenth Day of August 1977

[SEAL]

Attest:

RUTH C. MASON
Attesting Officer

C. MARSHALL DANN
Commissioner of Patents and Trademarks